United States Patent [19]

Sawada

[11] Patent Number: 5,754,430
[45] Date of Patent: May 19, 1998

[54] CAR NAVIGATION SYSTEM

[75] Inventor: Yasuhiro Sawada, Wako, Japan

[73] Assignee: Honda Giken Kogyo Kabushiki Kaisha, Tokyo, Japan

[21] Appl. No.: 407,418

[22] Filed: Mar. 17, 1995

[30] Foreign Application Priority Data

Mar. 29, 1994 [JP] Japan ................... 6-059250

[51] Int. Cl.$^6$ ................... G06F 165/00
[52] U.S. Cl. ................... 364/449.3; 364/449.5; 340/990; 340/995
[58] Field of Search ................... 364/443, 444.2, 364/449.2, 449.5, 449.1, 449.3; 73/178 R; 340/988, 990, 995

[56] References Cited

U.S. PATENT DOCUMENTS

| | | | |
|---|---|---|---|
| 4,827,420 | 5/1989 | Musa | 364/449 |
| 4,992,947 | 2/1991 | Nimura et al. | 364/444 |
| 5,107,433 | 4/1992 | Helldörfer et al. | 364/444 |
| 5,115,399 | 5/1992 | Nimura et al. | 364/444 |
| 5,191,532 | 3/1993 | Moroto et al. | 364/444 |
| 5,353,034 | 10/1994 | Sato et al. | 364/449 |
| 5,359,527 | 10/1994 | Takanabe et al. | 364/444 |
| 5,422,815 | 6/1995 | Hijikata | 364/443 |
| 5,452,212 | 9/1995 | Yokoyama et al. | 364/444 |
| 5,486,822 | 1/1996 | Tenmoku et al. | 364/444 |
| 5,508,931 | 4/1996 | Snider | 364/444 |

FOREIGN PATENT DOCUMENTS

| | | |
|---|---|---|
| 60-202307 | 10/1985 | Japan . |
| 3257485 | 11/1991 | Japan . |
| 4219872 | 8/1992 | Japan . |
| 599678 | 4/1993 | Japan . |

*Primary Examiner*—Gary Chin
*Attorney, Agent, or Firm*—Lyon & Lyon LLP

[57] ABSTRACT

A car navigation system including route judgment means for judging whether an input place name is suitable for a route extending to a destination, and judgment result output means for outputting a judgment result, so that a car can be guided and navigated along a suitable route extending to the destination by inputting a place name written on a road sign or the like. The judgment result is output with a voice message or image display. When plural place names are input, the judgment is made on each of the place names, and the most suitable place name is selected and output.

14 Claims, 13 Drawing Sheets

FIG. 7(a)
JUDGMENT ON SUITABILITY OF ROUTE ON THE BASIS OF DIRECTIONS OF DESTINATION AND INPUT VIA-PLACE WHEN INPUT PLACE NAME IS ONE
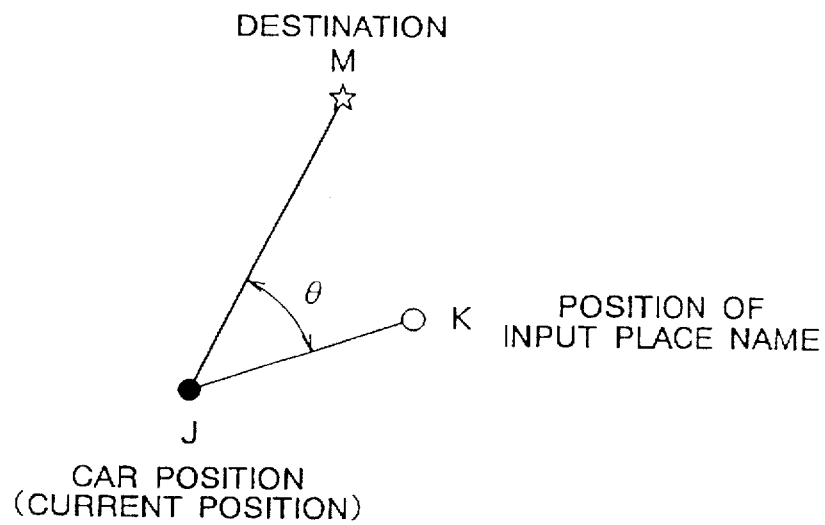
FIG. 7(b) JUDGMENT ON SUITABILITY OF ROUTE ON THE BASIS OF DIRECTIONS OF DESTINATION AND INPUT VIA-PLACE WHEN INPUT PLACE NAME IS PLURAL
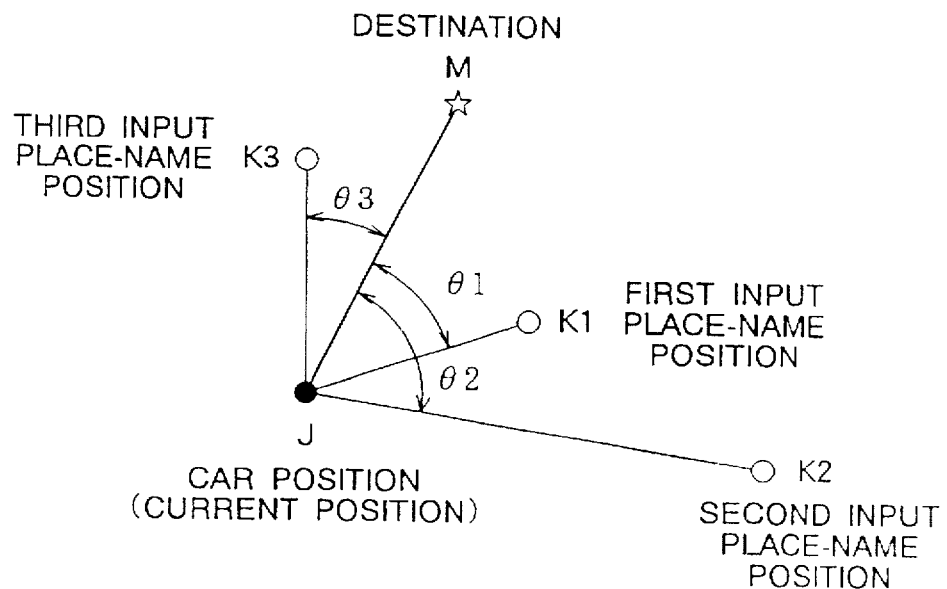

COURSE SUITABILITY JUDGMENT BASED ON COMMON PORTION BETWEEN ROUTE TO DESTINATION AND ROUTE TO INPUT PLACE NAME WHEN INPUT PLACE NAME IS ONE

COURSE SUITABILITY JUDGMENT BASED ON COMMON PORTION BETWEEN ROUTE TO DESTINATION AND ROUTE TO INPUT PLACE NAME WHEN INPUT PLACE NAME IS PLURAL

Fig. 11(a) EXAMPLE OF ROUTE GUIDE IMAGE WITH DISPLAY OF CAR POSITION, DESTINATION AND POSITION OF ALL INPUT PLACE NAMES
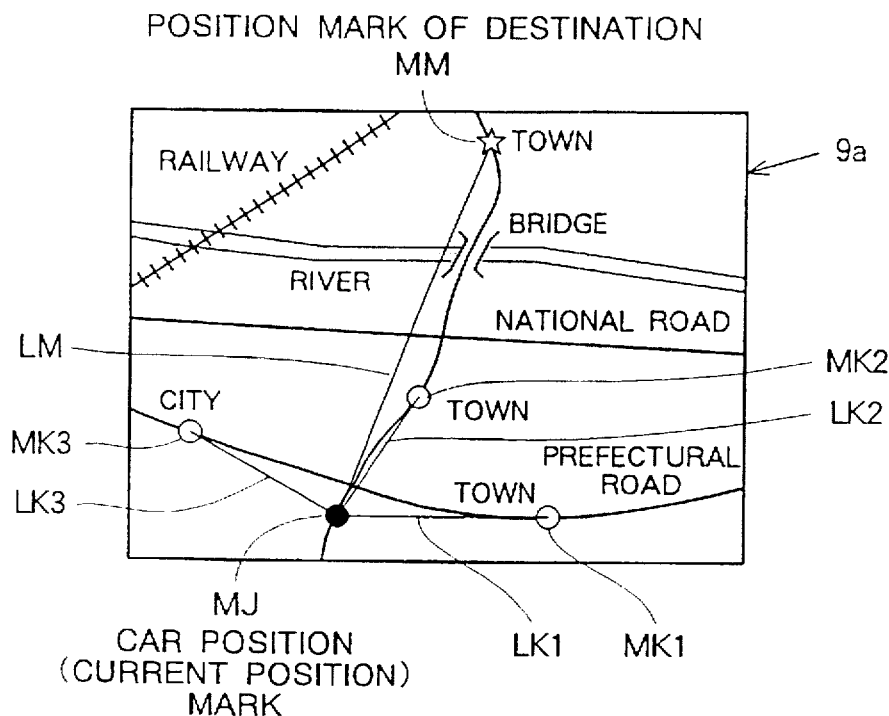
Fig. 11(b) EXAMPLE OF ROUTE GUIDE IMAGE WHEN DESTINATION AND POSITIONS OF SOME INPUT PLACE NAMES CANNOT BE DISPLAYED
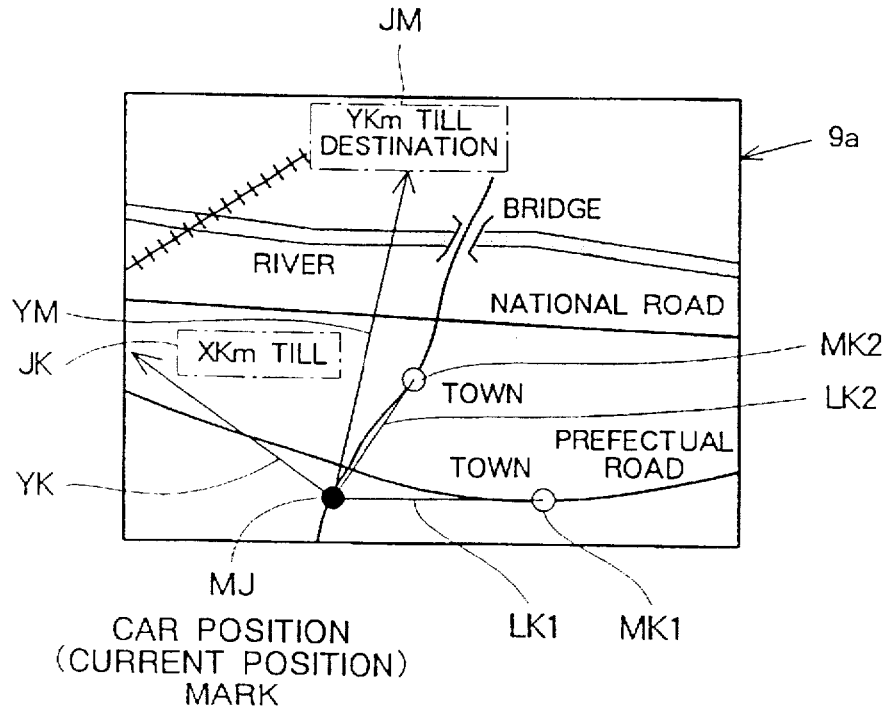

EXAMPLE OF SIGNPOST

EXAMPLE OF SOLID CROSSING

CAR NAVIGATION SYSTEM

BACKGROUND OF THE INVENTION

1. Field of the Invention

This invention relates to a car navigation system for obtaining information on a route which is suitable to guide or navigate a car (vehicle) to a destination by beforehand registering the destination and inputting at least one place name indicated on a road sign.

2. Description of the Related Art

There has been known a car navigation system in which a route extending to a destination is preset, and a course to be selected, such as "turning to the left or right", "keeping straight on" or the like, is guided using voice synthesis or the like when a car arrives at the front side of a crossing or the like. In such a system, the course guide is made with synthesized voice or the like at all times irrespective of driver's need every time the car arrives at this side of a crossing or the like, and thus the voice may sound offensive to the driver's ear. In order to overcome such a disadvantage, a car navigation system for outputting road guide information with voice immediately when a request (navigation request) is made from a driver is proposed in Japanese Laid-open Patent Application No. Hei-5-99678.

In addition, a map display device for a car in which a destination and a current position can be set by inputting the names of places, etc. displayed on a map with voice is also proposed in Japanese Laid-open Patent Application No. Hei-3-257485.

Furthermore, for a solid road as shown in FIGS. 12(a) and 12(b) which has been recently developed in cities, the car position is indicated at the same position on a map which is displayed on a display unit or the like of a car navigation system when a car runs on any road of a high level road 121, a ground road 122 and an underground road (tunnel) 123. In order to avoid such a problem, Japanese Laid-open Patent Application No. Hei-4-219872 proposes a voice guide device in which a road environment is specified in accordance with a view from a car window, for example, (1) only a distance view can be taken because of high level road, (2) only a close-range view can be taken because of a general road, or (3) no view can be taken because of a covered road, and a guide sentence (message) is prepared in accordance with the specified road environment to perform the road guide with synthesized voice.

In the car having the navigation system, a driver drives his car while checking the position of the car or the course (direction) of the car by seeing a road sign as shown in FIG. 13. When the same place name as the final destination is indicated on a road sign, the driver identifies the course without losing his way. However, the same place name as the destination is not necessarily indicated on a road sign. In this case, the driver must decide a suitable course on the basis of one or plural place names which are indicated on a road sign. Here, if the driver knows his way around an area in which he drives currently, he can decide the course on the basis of the names of places which will be passed until the car reaches the final destination (hereinafter these places are referred to as "via-places"). However, if he does not know well his way around the area, he cannot decide the suitable course. Therefore, there has been required a device in which by inputting the names of via-places displayed on road signs or the like, the car can be guided and navigated along a course which is suitable to lead the car to the final destination, on the basis of judgment as to whether it is suitable to lead the car to a course extending to the name of a via-place. In the car navigation system as disclosed in Japanese Laid-open Patent Application No. Hei-5-99678, a travel route must be preset, and this is a cumbersome work. A navigation system having an advance indication function as disclosed in Japanese Laid-open Patent Application No. Sho-60-202307 is designed to indicate a course to a car at every crossing by inputting a travel start point and a destination point. However, in the navigation systems of the Japanese Laid-open Patent Application Nos. Hei-5-99678 and Sho-60-202307 as described above, the judgment on "turning to the left or right", "keeping straight on", etc. is made on the basis of a road map to indicate a suitable course to a driver.

Therefore, for example, in a case where a crossing at which the car is to change its course is a solid crossing as shown in FIG. 14, a voice guide indicating "turn to the right OOmeters ahead" would be merely made insofar as a map data base is provided with no information indicating a solid crossing structure when the car is instructed at the solid crossing to change its course from a course in the north direction on a road A to another course in the east direction on a road B. However, various structures may be designed for solid crossings, and thus even when the course change (turning to the right) is beforehand indicated, it is unclear whether it is suitable to keep a right lane in accordance with the indication.

Accordingly, in order to enable making a guide indicating "pass from a left lane through a bypass and enter a road B" in accordance with the structure of the solid crossing is required a map data base having road environment data containing the detailed structures of solid crossings as disclosed in the Japanese Laid-open Patent Application No. 4-219872. However, such a map data base needs a large amount of data, and thus a larger capacity storing medium (for example, plural CD-ROMs) and a storing medium reading device for accessing the storing medium at high speed (for example, CD-ROM automatic changer or the like) are required, so that the system becomes complicated and high in price. In addition, a larger number of steps for renewal and maintenance of road environment data are required.

SUMMARY OF THE INVENTION

The present invention has been implemented to overcome the above problem, and has a first object to provide a car navigation system for guiding and navigating a car along a suitable route extending to a destination on the basis of place names which are indicated on road signs even when a general data base having no road environment data on the structures of solid crossings, etc. is used, and in other words, a car navigation system for assisting a driver to surely judge his route on the basis of the road signs even in a geographically unfamiliar area around which the driver does not know his way.

Furthermore, the present invention has a second object to provide a car navigation system which can surely guide and navigate the car to a suitable course even in such a case where the driver does not known an accurate place name (Japanese rendering or pronunciation) because in some cases the driver does not accurately know the pronunciations (the Japanese rendering) of some place names written in Kanji on road signs in a geographically unfamiliar area, and in which place names can be hand-written with characters such as Hiragana, Katakana or the like which are relatively easily input and easily recognizable even under a vibrational running condition.

In order to attain the above objects, a car navigation system according to a preferred embodiment includes route judgment means for judging whether an input place name is suitable for a route extending to a destination, and judgment result outputting means for outputting a judgment result of the route judgment means. Accordingly, by inputting a place name written on a road sign or the like, it can be suitably indicated which course should be selected. Therefore, even when the driver or the like does not recognize the geographical relationship between a destination and a place name written on a road sign or the like in a geographically unfamiliar area, he can take the suitable course on the basis of the place name written in the road sign or the like.

In a car navigation system according to the claim 2, place names indicated on a map which is reproduced and displayed on a screen by an image display device and data on pronunciations of the place names (written in Kanji) are provided to a road map data base. Therefore, place names such as via-places, etc. can be specified by inputting the place names with voice using a voice recognition device (in the following description, a via-place is defined as a place through which the car passes to the destination). Furthermore, when a hand-writing input device is used, the place names such as via-places can be also specified by inputting the place names in Hiragana or Katakana with a pen or the like. Accordingly, a hand-write character recognizing unit of this system can be more facilitated in construction than a hand-write input device which needs recognition of Kanji. In addition, it is difficult to accurately input complicated Kanji characters during running because of car vibration. On the other hand, the Hiragana or Katakana character input of the place names makes the hand-writing input operation more easily.

In a car navigation system according to another embodiment, in addition to an accurate (formal) pronunciation for each place name, data on other ways of pronunciation (hereinafter referred to merely as "pronunciations") for each place name may also be provided. Accordingly, even when the driver or the like does not known the formal place names because of a geographically unfamiliar area, the place names written on road signs, etc. can be input by voicing or hand-writing an adequate (informal) pronunciation for each place name.

For example, in the car navigation system having the place name input means using a voice recognition device and the judgment result output means using a voice synthesizer, when the driver or the like voices one or plural place names which are written on a road sign, the place name input means analyzes the voice and supply the input one or plural place names to the route judgment means.

On the basis of the datum on the current position of the car which is supplied from a car position detection device, the route judgment means recognizes the position at which the car is currently located, and judges whether a route containing a place whose name is input from the place name input means as a via-place name is suitable, thereby allowing the car to arrive at a destination (final destination) which is preset by destination setting means. If plural place names are input, the above judgment is made on each place name, and the most suitable one (place name, route) is selected and output.

Through the judgment as described above, the route is judged to be suitable when an angle at which a line connecting the car current position and the destination intersects to a line connecting the car current position and an input place-name point is below a predetermined threshold value.

If there are plural input place-name points which satisfy the above angle condition (below the predetermined threshold angle value), a route containing a place name providing the smallest angle in these plural place names may be selected.

Furthermore, the suitability judgment may be made on the basis of the distance of a common portion between a route extending from the current position to the destination and a route extending from the current position to an input place name. Besides, the suitability judgment may be made on the basis of the distance of a route extending from the current position through an input place name (via-place) to the destination. In a case where a route extending to an input place name contains a route (road) such as a superhighway on which the car can run at a higher speed than on a general road, the distance of the road (superhighway) may be converted (reduced) to a shorter value than its actual distance (conversion of the distance on the basis of a preset reduction rate) to calculate the distance to the destination, and a route through which the car arrives at the destination most early may be selected/identified on the basis of the converted distance (calculated in consideration of an arrival time).

When a judgment result on the suitable route is given, the judgment result output means allows the suitable route to be audibly supplied by voice synthesis, whereby the driver can take the suitable route.

In the above system, the place name input means may be constructed by the hand-write character input device and the hand-write character recognition device, and the judgment result output means may be designed to display a route which is judged to be suitable on a map which is reproduced and displayed on a screen of a display unit, and a line connecting the car current position and a via-place which is judged to be suitable.

BRIEF DESCRIPTION OF THE SEVERAL VIEWS OF THE DRAWINGS

FIGS. 7(a) and 7(b) are schematic diagrams showing a first embodiment of a suitability judgment on a route extending to a destination (judgment based on a course direction);

FIGS. 11(a) and 11(b) are schematic diagrams showing an example of a course guide image;

DETAILED DESCRIPTION OF THE PREFERRED EMBODIMENTS

Preferred embodiments according to the present invention will be described hereunder with reference to the accompanying drawings.

Figure 1:
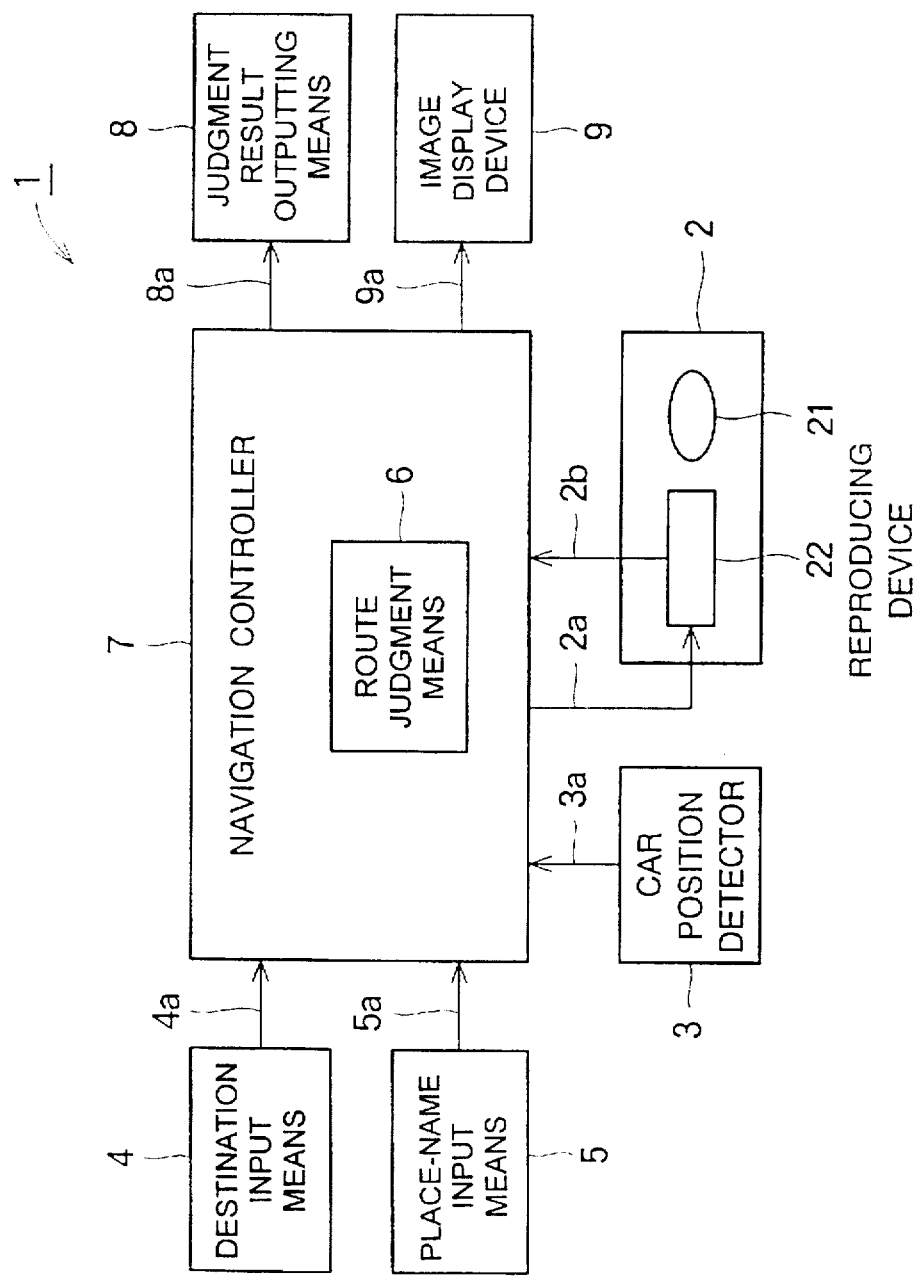
FIG. 1 is a block diagram showing a car navigation system according to a preferred embodiment of the present invention.

FIG. 1 is a block diagram showing the overall construction of a car navigation system according to a preferred embodiment of the present invention. The car navigation system 1 includes a road map data base 2, a car position detector 3, a destination input means 4, a place-name input means 5, a navigation controller 7 having a route judgment means 6, a judgment result output means 8 and an image display device 9.

Reference numeral 2a represents an access request signal for accessing the road map data base 2, reference numeral 2b represents a data output signal to be output in response to the access request signal 2a, reference numeral 3a represents car position data, reference numeral 4a represents input information on the destination setting, reference numeral 5a represents input information on a place name which is a target for a route judgment, reference numeral 8a represents information on the judgment result, and reference numeral 9a represents a display unit driving signal such as a video signal or the like.

The road map data base 2 comprises a CD-ROM (compact disc ROM) 21 on which road map information is recorded, and a reproducing device 22 for the CD-ROM 21. In the road map data base 2 are beforehand stored map data for generating maps on various reduced scales such as a broad area map, a middle area map, a detailed area map, etc., various kinds of display matters to be indicated on a map which is displayed on the image display device 9, such as names of superhighways, national roads, local roads, etc., attributes and display data (character data containing Kanji, etc.) of main buildings, railways, rivers, lakes, etc., and at least pronunciation data (character data of Hiragana or Katakana) for place names in accordance with a predetermined data base format (structure).

With respect to the pronunciation data, the data base format is designed so that plural ways of pronunciation (hereinafter referred to merely as "pronunciations") (i.e., not only one pronunciation) may be registered for each place name. Accordingly, with respect to place names which are hard to pronounce or liable to be mispronounced because these names are written in Kanji, plural pronunciations are beforehand registered for these place names so that the place name concerned can be specified with any one of the registered pronunciations for the place name. For example, plural pronunciations "Tokorozawa", "Tokorosawa", "Shozawa", "Shosawa", etc. are registered for the place name of Kanji character "所沢". These plural pronunciations are managed so that the formal (i.e., correct) pronunciation and the informal pronunciations for the place name are discriminable from each other. Accordingly, when the current position of the car is requested to be audibly output to the driver or the like using the voice synthesis (i.e., so that the driver or the like can hear a synthesized voice representing the current position), the car navigation system 1 of this embodiment can voice to the driver the place name of the car current position with the formal pronunciation.

The road map data base 2 may comprise a recording medium such as a magnetic recording medium, a magneto-optical recording medium or a semiconductor memory in place of the CD-ROM, and a read-out device therefor.

Figure 2:
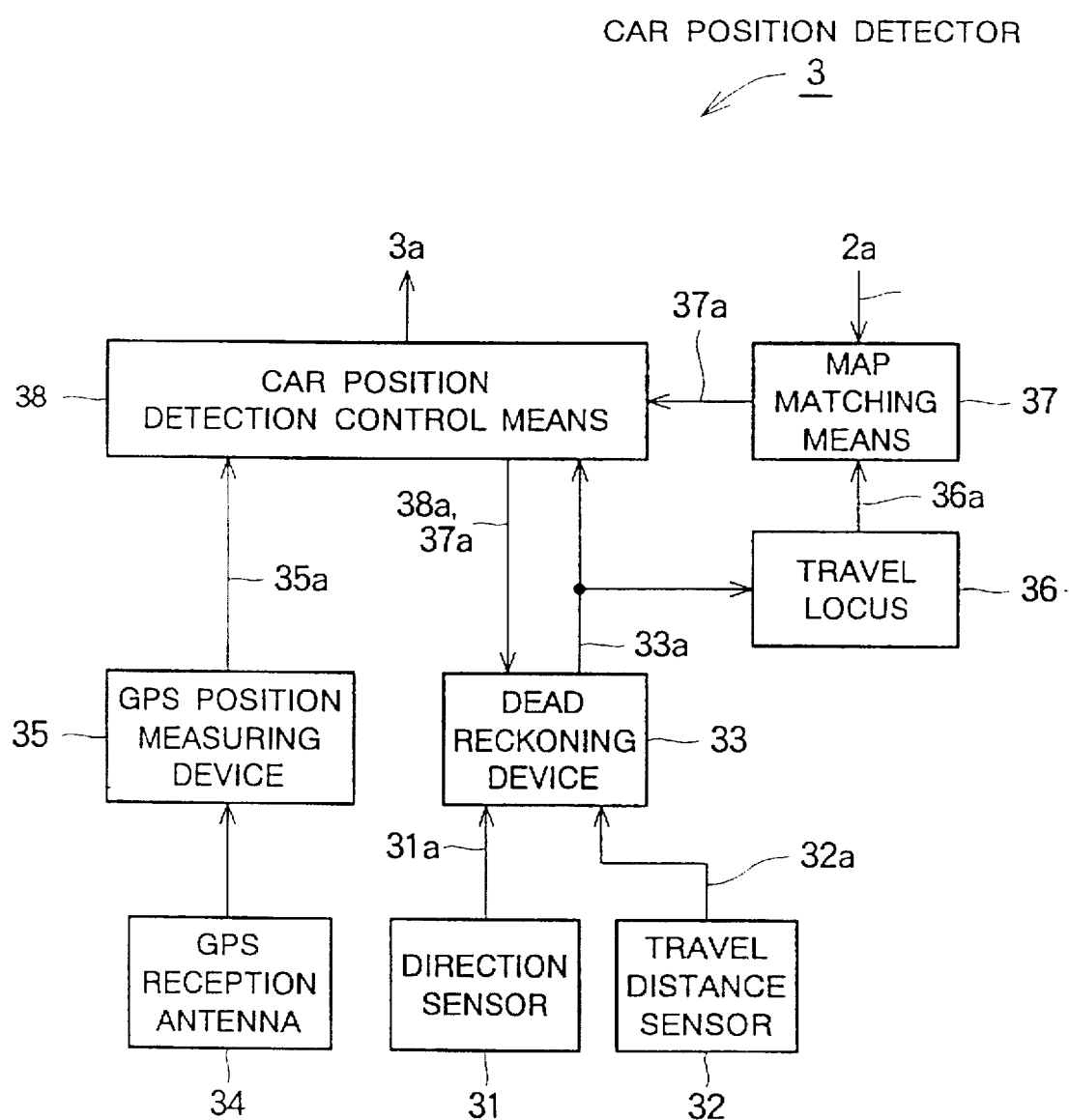
FIG. 2 is a block diagram showing a car position detector.

FIG. 2 is a block diagram showing an embodiment of the car position detector shown in FIG. 1. The car position detector 3 is designed so as to use jointly a dead reckoning navigation device 33 which successively calculates the position of the car on the basis of a direction signal 31a from a direction sensor 31 such as a gyro, a geomagnetic sensor or the like and a distance signal such as a pulse signal or the like which is output every predetermined unit travel distance from a travel distance sensor 32 such as a wheel rotation sensor or the like, and a GPS position measuring device 35 for detecting the position of the car on the basis of signals which are received from plural GPS satellites using a GPS reception antenna 34. Accordingly, even when it is impossible to receive waves from the GPS satellites, the current position of the car can be guessed by the dead reckoning navigation device 33.

The car position detector 3 is further provided with a travel locus calculation means 36 for obtaining a travel locus on the basis of car position data 33a which are successively output from the dead reckoning navigation device 33, and a map matching means 37 for comparing travel locus data 36a output from the travel locus calculation means 36 with road data 2a read out from the road map data base 2 to correct the current position of the car so that the car is located on a road in consideration of features of the travel locus such as crossings, bending points, etc.

When no setting operation is carried out for the current position of the car (initial position), the car position detection control means 38 in the car position detector 3 supplies the dead reckoning navigation device 33 with position data 35a output from the GPS position measuring device 35 as an initial position or temporary position data 38a, and also outputs it as car position data 3a. The car position detection control means 38 supplies the dead reckoning navigation device 33 with position correction data 37a which are output from the map matching means 37 to correct the current position data of the car, and supplies the navigation control unit 7 with the newest car position data 33a which are successively output from the dead reckoning navigation device 33 as the car position data 3a.

Figure 3:
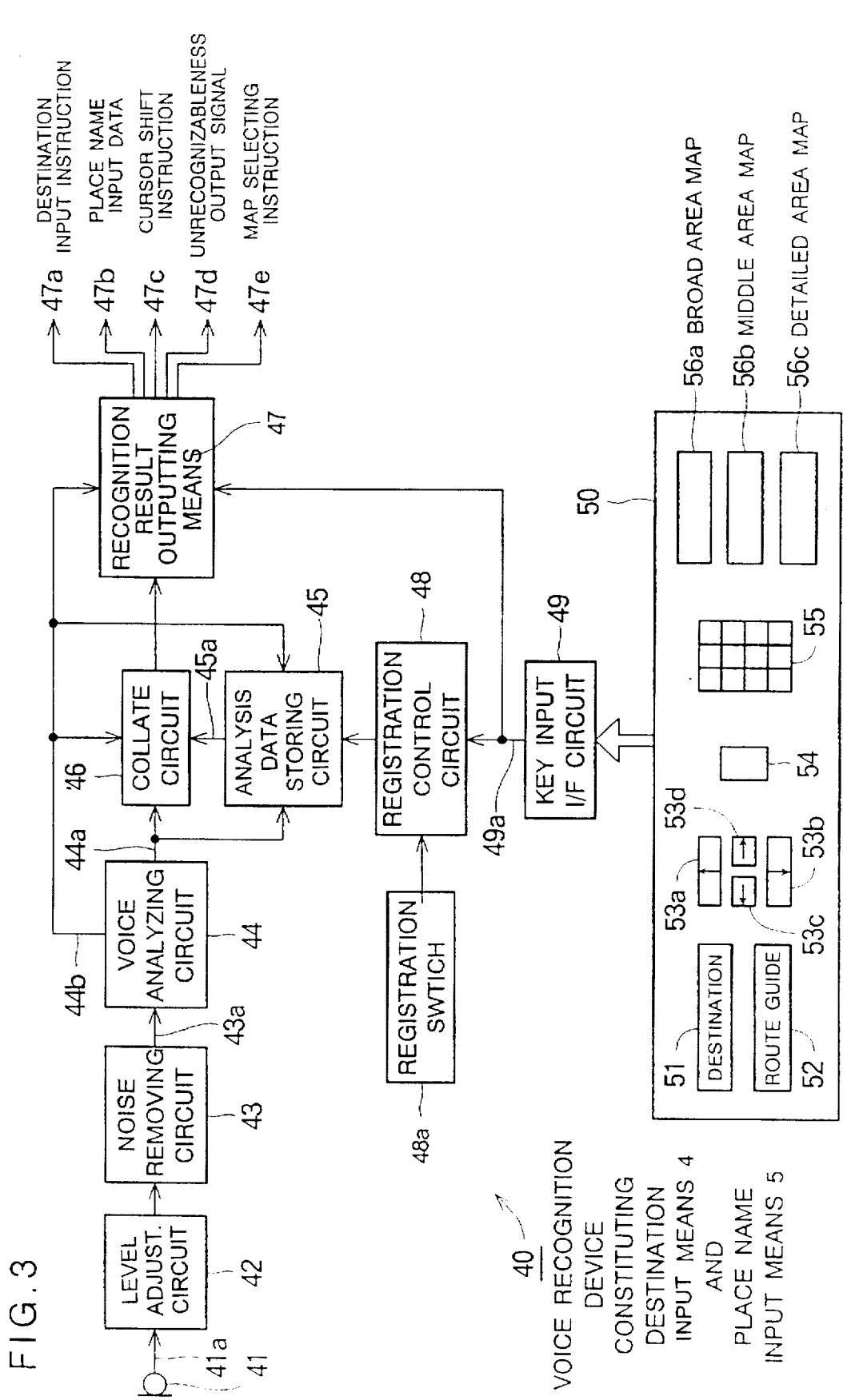
FIG. 3 is a block diagram showing a voice recognition device.

FIG. 3 is a block diagram showing a destination setting means and a place name input means.

The destination input means 4 and the place name input means 5 (see FIG. 1) are designed to input a destination and a place name serving as a target for the course judgment with a voice using a voice recognition device 40. The voice recognition device 40 can recognize the voice of any speaker, and its recognition rate can be improved by beforehand registering the voice of a specific speaker (for example, a driver).

Therefore, the voice recognition device 40 includes a level adjustment circuit 42 having an AGC function for adjusting the output signal 41a of a microphone 41 to a predetermined signal level, a noise removing circuit 43 for removing noise components and emphasizing a specific frequency band component and removing undesired frequency components so that a voice signal is suitable for voice analysis, a voice analyzing circuit 44 for analyzing the features of a voice signal 43a for analysis from which the noise components are removed and which has frequency components suitable for the voice analysis to code the voice signal 43a, a collate circuit 46 for comparing and collating the analysis data (voice input) 44a output from the voice analysis circuit 44 and the analysis data (comparison reference) 45a supplied from an analysis data storing circuit 45 to output analysis result data 46a representing coincidence or similarity degree for these analysis data, a recognition result output means 47 for outputting a destination input command 47a and place-name input data 4b on the basis of the analysis result data 46a, monosyllable data and vocabulary data 45b, a register control means 48 for registering the voice of a specific speaker, a key input interface (I/F) circuit 49 and an operation unit 50 having various operation keys.

The analysis data storing circuit 45 is designed so that analysis data for the voice of an unspecific speaker and analysis data for the voice of a specific speaker are stored in discrete storage areas. The register control means 48 is designed so that when the destination key 43a is pushed down in a state where a voice register switch 48a is set to a register mode and then "Destination" is voiced, the vocabulary analysis data for "Destination" is stored in the analysis data storing circuit 45 while making a correspondence between the pushed key and data representing the function of the key.

The operation unit 50 includes a destination key 51 for registering a command voice (command words) when the destination is input with voice, a road guide key 52 for registering an command voice (command words) for starting a road guide operation, cursor shift keys 53a to 53d for scrolling a map displayed on the screen of the image display device 9 and registering an command voice (command words) to shift a position indicating cursor displayed on the map, an enter (set) key 54 for registering an command voice (command words) to determine and input the position of the shifted cursor, and a voice register key 55 which has plural keys and serves to register the voiceless sounds of the Japanese syllabary, the voiced sounds, the syllabic nasal in Japanese, numerals, words such as alphabetic letters, etc. in accordance with the pushing frequency of each key and the combination of pushed keys (multi-pushing).

The unspecific speaker can start the destination set mode and a mode for inputting a place name for course guide by voicing a predetermined key word. For example, the voice of "destination" starts the destination set mode and the voice of "course guide" starts the course guide mode, and then the next voice of "Tokorozawa" (place name) allows input of a place name corresponding to the destination, a via-place name or the like.

On the other hand, the specific speaker such as a driver or the like can register his favorite words in accordance with the operation of the keys 51 to 55. Any words such as "the end of travel" and "which course" may be used and registered for the destination setting and the start of the course guide, respectively. The words of "ue", "shita", "hidari", "migi", "up", "down", "left", "right", etc. may be used and registered as command words (key words) for the shift of the cursor and the scroll of the map, and further the word of "OK" may be used and registered as a command word (key word) to determine the cursor position and the map.

The destination setting means 4 and the place-name input means 5 are designed so that the input operation can be performed by using the various keys 51 to 55 of the operation unit 50 and by jointly using the operation of the keys 51 to 55 and the voice. For example, the following actions may be performed. That is, the destination key 51 is pushed to shift the mode to the destination register mode, and then a destination name is input with voice. Thereafter, the road guide key 52 is pushed to shift the mode to the course guide mode, and then the via-place name is input with voice. Accordingly, the recognition result output means 47 monitors the key input information 49a output from the key input interface circuit 49 at all times, and it is designed to generate and output not only the commands corresponding to the voice input, but also the commands corresponding to the key input and data 47a to 47c. Reference numeral 47c represents a cursor shift command for scrolling the cursor position and the map or determining them, and reference numeral 47d represents a voice unrecognizableness output signal representing that the voice recognition cannot be performed.

The operation unit 50 is provided with map type selection keys 56a to 56c for selecting the map type such as a broad area map, a middle area map, a detailed area map or the like. When the map type selection keys 56a to 56c are operated, the corresponding map selection command 47e is output from the recognition result output means 47. The selection of the map type may be performed by voicing a key word such as "broad area map", "middle area map", "detailed area map" or the like.

The voice analysis circuit 44 is provided with a continuous word judgment circuit for judging a series of voice period (phrase) on the basis of an envelope waveform of an analysis voice signal and time variation of a power spectrum, and supplies the judgment result 44b to the collate circuit 46, the recognition result output means 47, the register control means 48, etc. to identify the punctuation of the voice input command. Accordingly, even when plural place names of "Tokorozawa", "Kawagoe" and "Omiya" are input for the course guide, these voices are identified as three kinds of place names, and the place-name input data 47b of the three place names are supplied to the navigation control unit 7.

Figure 4:
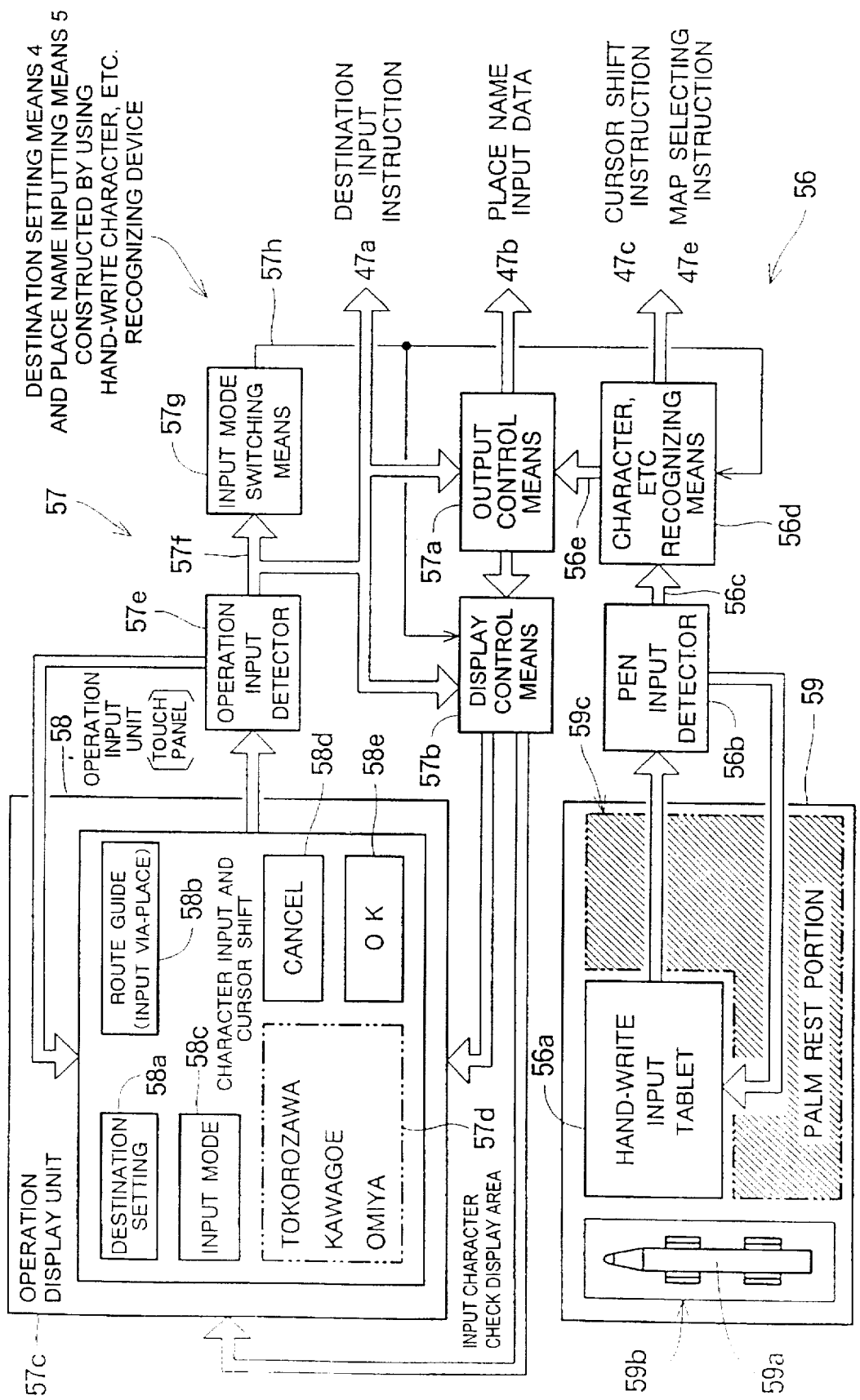
FIG. 4 is a block diagram showing a destination setting means and a place name input means.

FIG. 4 is a block diagram showing another embodiment of the destination setting means and the place-name input means.

The destination setting means 4 and the place-name input means 5 shown in FIG. 4 are designed so that the destination and the place names serving as targets for the route judgment can be input with a pen using a hand-write character recognition device 56.

A pen input operation which is conducted on a handwrite input tablet 56a of pressure-sensitive type or electromagnetic induction type is detected by a pen input detector 56b, and the hand-write character recognition means 56d makes an analysis of writer's handwriting, an analysis of the order of making strokes in writing a character, etc. on the basis of the detection output 56c of the pen input detector 56b. The character code data 56e corresponding to the identified characters are supplied to the recognition result output control means 57a in the recognition result check/output control unit 57.

The recognition result output control means 57a temporarily stores into a temporary storage means such as a RAM or the like (not shown) the character code data 56e which are successively supplied from the hand-write character recognition means 56d while considering the supply order (the handwriting order).

The display control means 57a obtains through a character generator (not shown) character font data corresponding to the temporarily stored character code data of a character or a character array, and displays a recognized character or character array on an input character check display area 57d of an operation unit display 57c comprising a liquid crystal display or the like.

An operation input unit 58 comprising a transparent touch panel switch or the like is provided on the display screen of the operation unit display 57c, whereby the operation input areas 58a to 58e corresponding to functional displays such as destination setting, course guide (via-place input), input mode switching, cancel (one-character delete for hand-written characters), OK (input character check), etc. are operated with a pen tip or a finger to perform the input of various kinds of functions. The input operation of the operation input unit 58 is detected by the operation input detector 57e, and when the input operation of the destination setting is carried out, the destination input command 47a is supplied to the navigation controller 7.

An input mode switching means 57g switches alternately the character input mode and the cursor shift mode with each other every time the detection output 57f corresponding to the input mode switching operation is supplied from the operation input detector 57e, and outputs an input mode indication signal 57h indicating the corresponding input mode. On the basis of the input mode indication signal 57h, the display control means 57b visibly displays the current input mode by turning on or turning on and off any one of "character input" mode and "cursor shift" mode on the operation unit display 57c. Upon reception of the detection output indicating the execution of the input operation of the destination setting or course guide (via-place input) from the operation input detector 57e, the display control means 57b turns on the character display of "destination setting" or "course guide (via-place input)" of the operation unit display 57c to visibly display the setting of the current mode.

When supplied with the input mode indication signal 57h representing the cursor shift mode, the hand-write character recognition means 56d outputs a cursor shift command 47c corresponding to the pen input direction (the shift direction of the pen) and the shift distance (or shift speed and shift distance) thereof. Through this operation, the scroll of the map and the shift of the cursor displayed on the map can be performed with the same operation performance as a pointing device (image position indicating device) such as a mouse or the like.

When the detection output of the cancel operation is output from the operation input detector 57d, the recognition result output control means 57a cancels the character code data which are supplied just before the supply of the detection output. Accordingly, the characters which are displayed on the input character check display area 57d are deleted from the rear side one by one every time the cancel operation is carried out. Through this operation, correction can be performed for an erroneous handwriting input or an erroneous recognition of a character. On the other hand, when supplied with the detection output of the OK (input character check) operation, the recognition result output control means 57a successively outputs the character code data corresponding to the character array, etc. which are temporarily stored in the temporary storage means as the place-name input data 47b. Through this operation, the place name of the destination or the place name which is a target for the course guide is supplied to the navigation controller 7.

The hand-write input operation unit 59 having the hand-write input tablet 56a is provided with a pen receiver 59b on which a pen 59a is mounted and fixed for an emergent use, and also provided with a palm rest portion 59c for mounting hands or wrists thereon below and at the side of handwrite input tablet 56a (a hatched area). Therefore, the handwriting input operation can be more stably performed even when running vibration occurs.

The handwrite character recognition unit 56d is designed to recognize only characters of Hiragana or Katakana, numerals and some symbols so that the data amount required for the analysis of the writer's handwriting and the order of making strokes in writing a character is reduced to reduce the storage area of these data, and a time required for recognition is shortened.

The handwriting input tablet 56a may be formed of transparent or excellently light-permeable material and disposed on the display screen of the operation unit display 57c.

Figure 5:
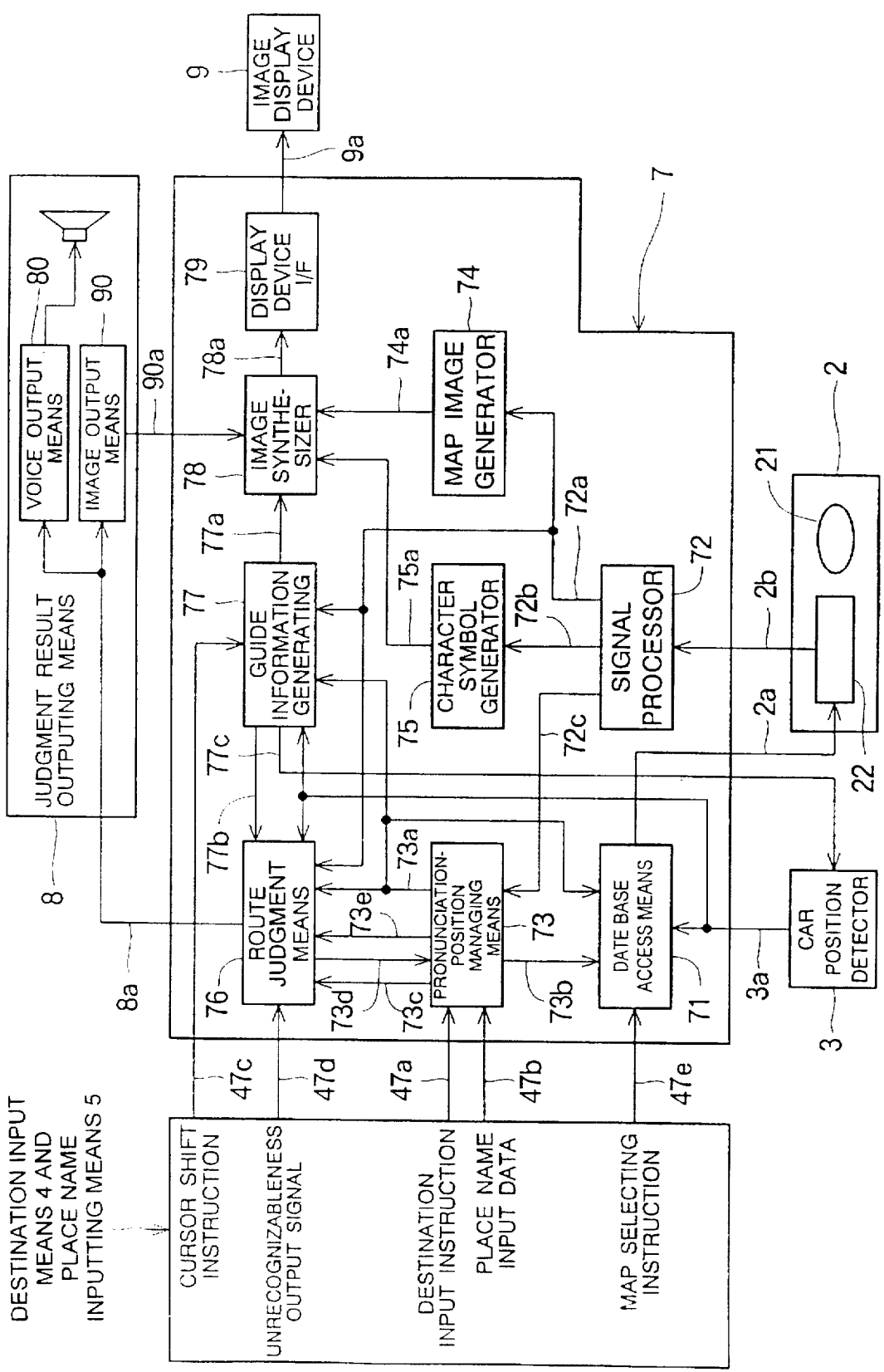
FIG. 5 is a block diagram showing a navigation controller.

FIG. 5 is a block diagram showing an embodiment of the navigation controller.

The navigation controller 7 includes a data base access means 71 for controlling a read-out (access) operation of data from the road map data base 2, a signal processor 72 for processing the read-out data 2b, a pronunciation-position managing means 73 for managing the relationship between the pronunciations of place names and the positions thereof on a map, a map image generator 74 for generating map image data 74a, a character symbol generator 75 for generating display image data 75a such as characters, symbols, etc. to be displayed on the map, a route judgment means 76, a guide information generating means 77 for generating guide image data 77a displayed on the display screen of the image display device 9, an image synthesizer 78 for combining the respective image data 74a, 75a and 77a to output the synthesized image data 78a, and a display device interface (I/F) unit 79. The navigation controller 7 may be formed of a microcomputer system.

The data base access means 71 has a function of indicating the map type such as the broad area map, the middle area map, the detailed area map or the like on the basis of the map selection command 47e, and a function of generating and outputting an access request signal 2a for accessing the corresponding data on the basis of the car position data 3a successively output from the car position detection means 3, the position data 73a output from the pronunciation-position management means 73, and a search request 73b.

The signal processor 72 analyzes the read-out data 2b on the basis of the preset data base format to decompose these data into the map data 72a, the character symbol data 72b, the pronunciation-position data 72c on the relationship between the pronunciation of a place name and its position on the map and then output these decomposed data. When the road map data base 2 comprises a CD-ROM and a reproducing device therefor, the signal processor 72 carries out various signal processing such as an error check, signal format conversion and serial-to-parallel signal conversion for the data 2b on the basis of reproduced signals.

The pronunciation-position management means 73 corresponds to a so-called dictionary for place names in which the position data 73a are output on the basis of the place-name input data 47b. On the basis of the presence or absence of the destination input command 47a, it judges whether the place-name input data 47b supplied from the voice recognition device 40 or the handwrite character recognition device 56 corresponds to the place name of the destination or the place name of a via-place or the like, and outputs the position data 73a containing information on the destination/via-place, etc.

When the pronunciation-position managing means 73 is designed to manage the place names of the map displayed currently on the image display device 9 and the pronunciation data thereof (containing plural pronunciation data other than the format pronunciation data) and there is no input place name on the map, a map which is nearest to the currently-displayed map in the direction extending to the destination is first indicated and the search request 73b is output. If the corresponding pronunciation is not detected in the data output signal 2b of the map which is preferentially indicated, those maps (excluding the preferentially-indicated map) which are nearest to the currently-displayed map are successively searched. However, if no corresponding pronunciation is still detected, those maps which are at the outside of and adjacent to the nearest maps are successively searched while preferentially searching a map in the direction extending to the destination. The preferential search of the map in the direction extending to the destination enables the search time to be effectively shortened.

Therefore, for generation of the search request 73b, the pronunciation-position managing means 73 supplies a search preferential direction guide request 73c to the route judgment means 76 which temporarily stores the position data of the beforehand-registered destination, and obtains preferential search map information 73d on the map to be preferentially searched from the route judgement means 76 to successively generate and output the search request 73b on the basis of the preferential search map information 73d.

This construction brings such an advantage that the storage capacity of the storage device for the pronunciation-position data, which is provided in the pronunciation-position managing means 73, can be reduced.

In order to set the destination itself, the adjacent maps are successively searched on the basis of the car current position as a reference position to shorten the search time. However, even by this manner, the search time may be long when the destination is far away from the current position.

Accordingly, all the pronunciation-position data which are stored in the CD-ROM 21 mounted on the reproducing device 22 of the road map data base 2 may be beforehand read into the pronunciation-position managing means 73, and stored in a storage device (for example, non-volatile memory or the like) provided in the pronunciation-position management means 73.

With this construction, the position data corresponding to any input place name in Japan can be obtained in a short time.

Furthermore, the pronunciation-position data may be provided in the pronunciation-position managing means 73 in place of the storage of the pronunciation-position data in the road map data base 2. With this construction, an existing road map data base having no pronunciation data, etc. is directly usable.

Still furthermore, the pronunciation-position data may be stored in a detachably-mounted storage medium such as an IC card type non-volatile memory or the like, whereby the destination setting and the course suitability judgment based on the via-place names through the place-name inputting operation are allowed by mounting the storage medium on the mount portion. In this case, the pronunciation-position data which are provided with only the pronunciations of place names displayed on a reproducing screen to meet the type of a CD-ROM 21 (map data storage medium) mounted on the reproducing device 22 may be supplied by the mountable storage medium. In this case, the pronunciation-position data for place names which are not displayed on the reproducing screen may be provided to perform a finer position setting. Furthermore, various pronunciation-position storage media for various purposes such as a leisure storage medium having pronunciation-position data on the names of golf places, hotels, sight-seeing places, etc., a business storage medium having the pronunciation-position data on the names of public offices, companies, etc. may be prepared to enable the destination setting and the course suitability judgment in accordance with the use purpose.

The map image generator 74 is designed to generate and output the map image data on the basis of the map data 72a supplied from the signal processor 72.

On the basis of the character symbol data 72b supplied from the signal processor 72, the character/symbol generator 75 generates and outputs display image data 75a for character information such as place names, road names, names of means of transportation, station names, the names of main buildings, etc. and symbols such as public offices, police offices, fire stations, post offices, hospitals, schools, shrines, temples, etc. so that these characters and symbols are displayed at prescribed positions on the map, and it is provided with a character generator (character/symbol generator) for generating fonts of characters, symbols, etc.

The route judgment means 76 includes a temporary storage device (for example, RAM) for temporarily storing the position data of the destination (MD), the car position data (JD) 3a and judgment target position data (KD1, KD2, KD3, . . . ) corresponding to the via-places input for the course suitability judgment. The route judgment means 76 judges it on the basis of each position data (MD, JD, KDn), the map data 72a and a route judgment method as described later whether a route extending to the destination is suitable, and outputs the judgment result 8a.

When the position data 73a supplied from the pronunciation-position management means 73 contains information representing that it is the destination, the route judgment means 76 judges the position data 73a to be the position data (MD) of the destination, and stores it into a prescribed storage address. When the position data 73a is judged to the judgment target position data (KD1, KD2, KD3, . . . ) corresponding to the via-place or the like, the route judgment means 76 stores it into a prescribed address, and counts the even number of the supplied position data to recognize the number of routes to be estimated.

When supplied with the search preferential direction guide request 73b from the pronunciation-position management means 73, the route judgment means 76 outputs data on a direction extending from the car position (J) to the destination (M) as preferential search map information 73d. When the route judgment means 76 can recognize the numbers or the like for the road maps, the number data or the like for a sectional map which is adjacent to the currently-displayed map in the direction extending to the destination may be output as the preferential search map information 73d. Furthermore, a relative direction of a map to be preferentially searched with respect to the currently-displayed map, such as a north side, an east side or the like, may be merely output.

When the route judgment means 76 receives a signal 47d representing that a place name or the like input by voice or handwrite cannot be recognized, from the destination setting means 4 and the place name input means 5 constructed by the voice recognition device 40 or the handwrite character recognition device 56, or receives a signal 73e representing that there is no place name concerned, from the pronunciation-position management means 73, the route judgement means 76 supplies the judgment result output means 8 with a judgment result 8a representing that the input is requested to be carried out again, or that the judgment cannot be performed. In this case, through the voice output means 80 in the judgment result output means 8, a voice guide message such as "please input once more", "the name of ΔΔ is not registered" or the like is output, and through the image output means 90 in the judgment result output means 8, message image data 90a such as "please input again", "the place name is unrecognizable" or the like is generated to display the guide image message on the screen of the image display device 9 through an image synthesizer 78 and a display device interface unit 79.

On the basis of the car position data 3a, the position data 73a for the place names containing classification information of destination/via-place, etc. and the map 72a, the guide information generator 77 generates and outputs a mark indicating an advance direction, a mark indicating the destination position, a mark indicating the position of a place name input for route judgment, and guide image data 77a on various guide information such as a line connecting the car position and the destination, a line connecting the car position and the position of a place name input for the route judgment (the respective lines are different in line type or display color), etc.

The guide information generating means 77 controls the shift of the position of the cursor displayed on the screen of the display device 9 on the basis of the cursor shift command 47c, and supplies the destination position register data 77b to the route judgment means 76 when the destination is registered by the determination input of the cursor position while it supplies the current position register data 77c to the car position detector 3 when the current position is registered.

The image synthesizer 78 combines the map image data 74a supplied from the map image generator 74, the display image data 75a such as the symbols/characters supplied from the character symbol generator 75, the guide image data 77a supplied from the guide information generating means 77 and the message image data 90a (when the judgment result is imaged and displayed) with one another to output synthesized image data 78a.

The display device interface (I/F) unit 79 converts the synthesized image data 78a to a display device driving signal 79a which is suitable for an input specification of the image display device 9, and outputs it. For example, it is equipped with a CRT interface circuit for generating and outputting an analog video signal when a CRT monitor display is used as the image display device 9, or with an LCD driving circuit or the like for converting the synthesized image data to a signal for driving each dot when an LCD (liquid crystal) display is used.

Figure 6:
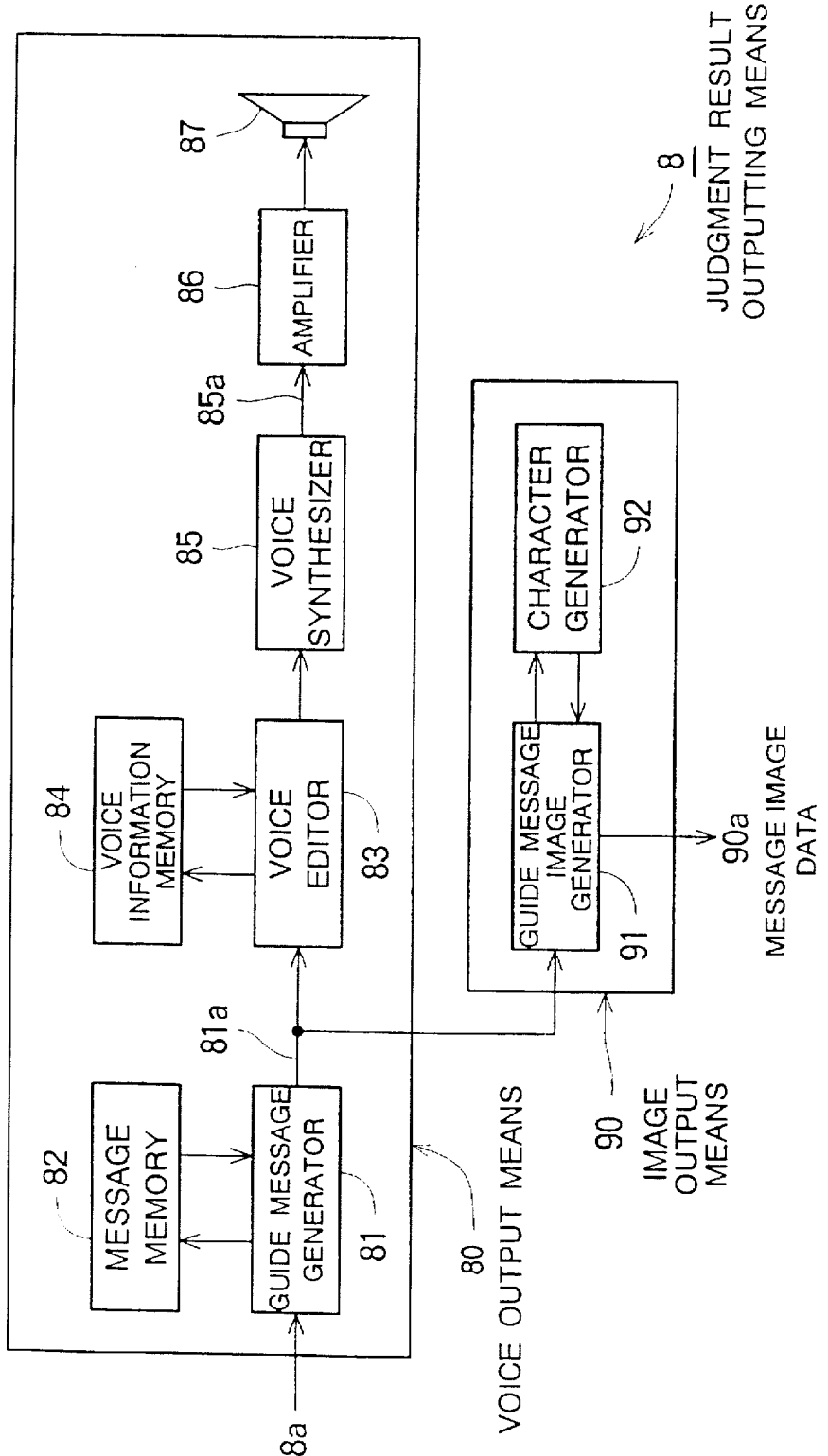
FIG. 6 is a block diagram showing a judgment result output means.

FIG. 6 is a block diagram showing the judgment result output means 8.

The judgment result output 8 means serves to audibly output the judgment result with voice and also to display a message sentence corresponding to the judgment result on the screen of the image display device 9, and thus it is equipped with the voice output means 80 and the image output means 90.

A guide message generating means 81 analyzes the judgment result 8a which is output on the basis of a preset rule to select a suitable one from plural messages which are beforehand stored in a message storage unit 82, and inserts a place name or the like into the message if necessary, whereby guide message data 81a are generated and output.

A voice editor 83 successively takes out desired voice information data from a voice information storage unit 84 on the basis of the guide message data 81a, and successively outputs the voice information data to a voice synthesizer 85. A voice signal 85a output from the voice synthesizer 85 is amplified by an amplifier 86 to drive an electro-acoustic transducer 87 of a speaker or the like. Through this operation, a voice message such as "ΔΔ direction" or "please go to OO direction" is output. When one place name is input and it is suitable to go toward the place name, a voice message of "OK" (if it is not preferably, a voice message of "NO") or the like is merely output.

A guide message image synthesizer 91 successively takes out character font data from a character generator 92 on the basis of the guide message data 81a to generate and output message image data 90a.

In place of independently providing the image output means 90, the message image data corresponding to the judgment result may be generated using the guide information generating means 77 in the navigation controller 7 shown in FIG. 5. Furthermore, the judgment result may be output with only voice or only an image.

FIGS. 7(a) and 7(b) are diagrams showing suitability judgment manners for a route extending to a destination.

In the suitability judgment manner shown in FIG. 7, a route is judged to be suitable if an intersectional angle θ between a line J-M connecting the current position (car position) J and a destination M and a line J-M connecting the current position (car position) J and the position K of an input place name is smaller than a predetermined threshold angle θth (for example, 60 degrees). If an angle between the destination direction and the direction of a place name serving as a judgment target is above 120 degrees, for example, a judgment result 8a representing that the direction should be inverted is output, and a message "the advance direction is opposite" or the like is given to the driver or the like.

When plural place names are input as judgment targets, intersectional angles θ1 between a line J-K1 connecting the current position (car position) J and the position K1 of a judgment target and a line J-M connecting the current position J and the destination M, θ2 between a line J-K2 connecting the current position J and the position K2 of another judgment target and the line J-M, and θ3 between a line J-K3 connecting the current position J and the position K3 of the other judgment target and the line J-M, are calculates as shown in FIG. 7(b), the place name which provides the smallest intersectional angle below the threshold value θth is judged to be the most suitable place name for the route.

As described above, the course suitability manner based on the positional relationship of the via-place Kn with the current position J and the destination M requires no road data 72a. The route judgment means 76 can judges the course suitability on the basis of only the position data 73a supplied from the pronunciation-position management means 73, so that the judgment can be performed in a short time. In addition, the route judgment means 76 is merely provided with the position relationship judgment means for judging the positions of plural places and the relationship thereamong, so that the hard structure can be made compact or the number of the program processing steps can be reduced.

When two or more via-places are input and the angles θ1 and θ2 shown in FIG. 7(b) are substantially equal to each other, the route judgment means 76 may output a judgment result 8a representing "any one of "OO" and "ΔΔ" is OK".

The higher route judgment can be performed by designing the route judgment means 76 so that the course suitability judgment is made in consideration of the map data 72a.

For example, when two or more via-places are input and the angles θ1 and θ2 shown in FIG. 7(b) are substantially equal to each other, the route judgment means 76 calculates the road distance of each route extending from the current position (car position) J through each input via-place name to the destination M on the basis of the map data 72a, and one of the via-place names which provides the shorter travel distance is judged as being suitable.

In this case, the road distance of the route extending through the input via-place name to the destination M is calculated when it is satisfied that the input place name is located at the car position side with respect to the destination M (nearer to the car position than the destination M). On the other hand, the road distance from the current position (car position) to the destination M is calculated when the input place name is farther away from the current position than the destination M.

The route judgment means 76 supplies the judgment result output means 8 with the pronunciation data of the place name and the judgment result 8a representing that the route containing the place name is the optimum route, whereby a voice message "OO is optimum" or the like is voiced from the judgment result output means 8, and a guide sentence having the same means is displayed on the screen of the image display device 9.

When the map data 72a contains information to discriminate superhighways, etc. and general roads from one another, the route judgment means 76 may calculate the value corresponding to an estimation time which is estimated to be taken until the car arrives at the destination, thereby performing the higher judgment containing the route information.

In a case where a route passing through a superhighway or the like to the destination can be set by selecting a route containing an input via-place or the like (the direction of the place name for which the course guide is requested), the route judgment means 76 calculates the road distance of the route containing the superhighway or the like so that the distance of an area in which a superhighway is usable is converted to a half of the actual distance, for example, and the course suitability judgment is made on the basis of the calculated road distance. Thereafter, it outputs the judgment result 8a containing the type information of usable roads and outputs from the judgment result output means 8 a guide message of "A superhighway is usable if you go to XX direction. If you use a general road, please go to OO direction" or the like.

Figure 8A:
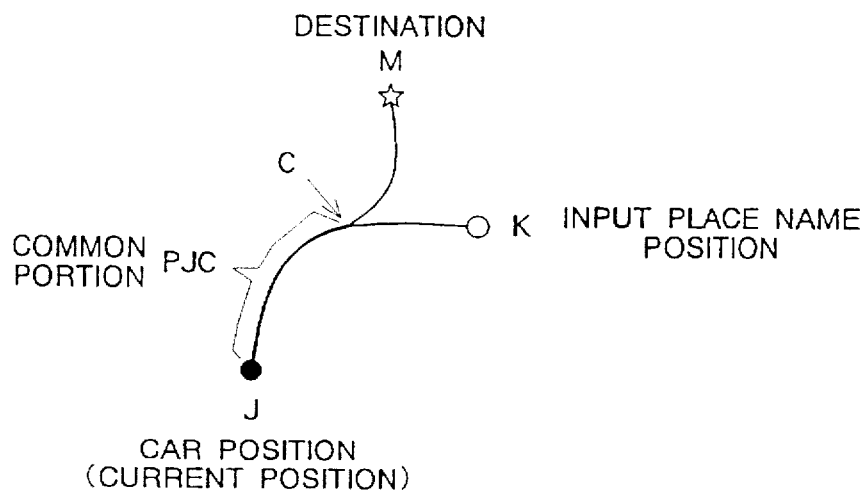
FIGS. 8(a) and 8(b) are schematic diagrams showing a second embodiment of the suitability judgment on the route extending to the destination (judgment based on route)
Figure 8B:
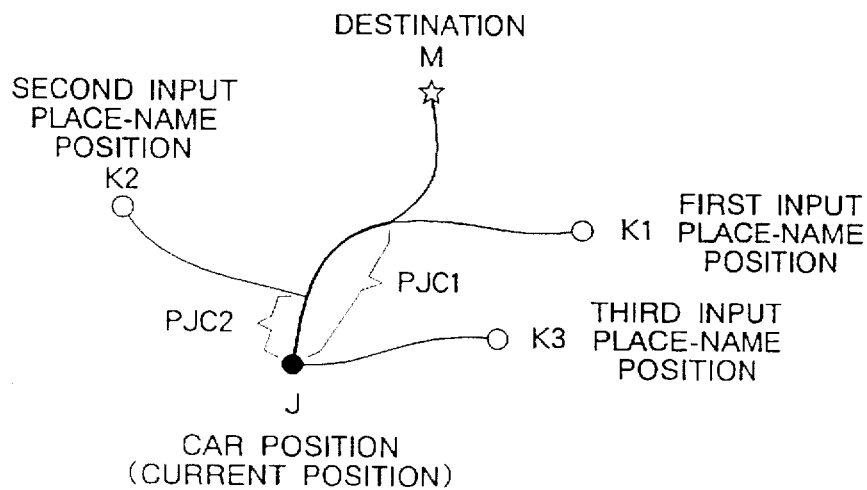

FIGS. 8(a) and 8(b) show another embodiment of the suitability judgment manner for the route extending to the destination.

The course suitability judgment manner shown is effective for the case where a route extending to the destination M is set manually or for the case where a function of automatically setting a route extending to the destination is provided. Furthermore, the accurate course guide can be performed even when the position of an input place name for the course guide is farther away from the current position than the destination.

As shown in FIG. 8(a), the route judgment means 76 compares a route (PJM) extending from the car position (current position) J to the destination M with a route (PJK) extending from the car position (current position) J to the position K of an input place name to judge whether there is a common portion between the routes (PJM) and (PJK). If there is a common portion PJC, the route judgment means 76 outputs the judgment result 8a representing that selection of the route extending to the input place name is suitable, and supplies audibly or visibly a message of "OO", "Please go to O direction" or the like through the judgment result output means 8.

When plural place names are input and respective routes extending to the respective input place names have a common portion with a route extending to the destination as shown in FIG. 8(b), the route judgment means 76 calculates the distance of the common portion (PJC1, PJC2) every route, or calculates the rate of the common portion to the route extending to the destination (PJC1/PJCM), (PJC2/PJCM) every route, and judges the route (the input place name) having the common portion of larger distance or larger rate as a more suitable route.

Furthermore, the route judgment means 76 may calculate the distance of the common portion and output the judgment result 8a containing the calculation result to output a guide message of "Please go to ΔΔ direction. It is necessary to change the course about XX kilometers ahead" or the like through the judgment result output means 8. With this message, it is understood by or suggested to the driver or the like that it is suitable at this time to go to the direction of the place name ΔΔ although it is not coincident with the direction to the destination.

FIGS. 9(a)–(d) show a third embodiment of the suitability judgment manner for the route extending to the destination.

Figure 9A:
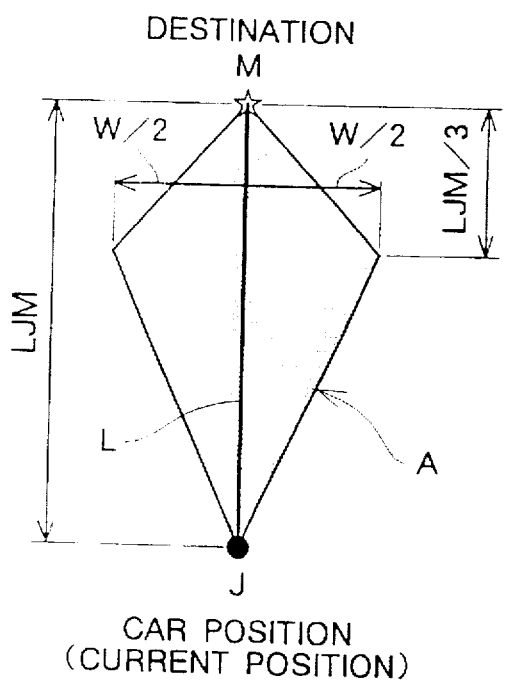
FIGS. 9(a)–(d) are schematic diagrams showing a third embodiment of the suitability judgment on the route extending to the destination (judgment based on set area)
Figure 9B:
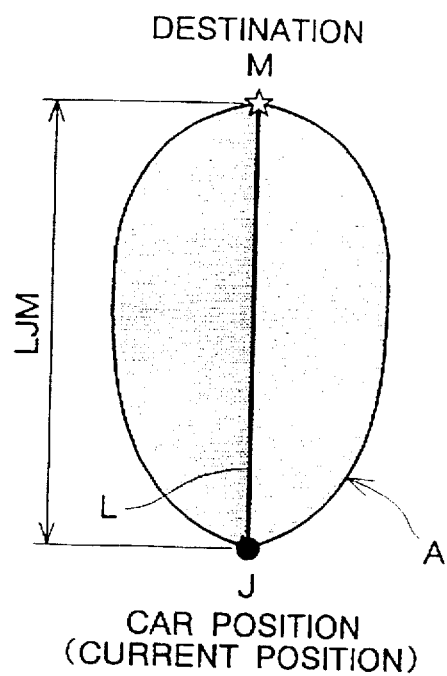

In this manner, a rhombic (FIG. 9(a)) or egg-shaped (FIG. 9(b)) area A which has a width (distance) W corresponding to the length (distance) LJM of a line L connecting the current position J and the destination M is set at both sides of the line L. If a place name input for the course guide exists in the area A, a route extending to the input place name is judged as "suitable". A portion having the largest width B in the area A is set so as to be nearer to the destination M, so that a course guide (navigation) in a direction which is deviated from a direction toward the destination can be prevented. In the case of FIG. 9(a), the widest portion in the area A is set away from the destination at a distance of one-third of the length (distance) LJM of the line L.

In this manner, the course suitability judgment is performed with no map data 72a, and thus the judgment and response can be performed for a short time. In addition, a permissible range of via-places, etc. is limited in accordance with the distance to the destination M, so that it is avoided to take a long roundabout way.

Figure 9C:
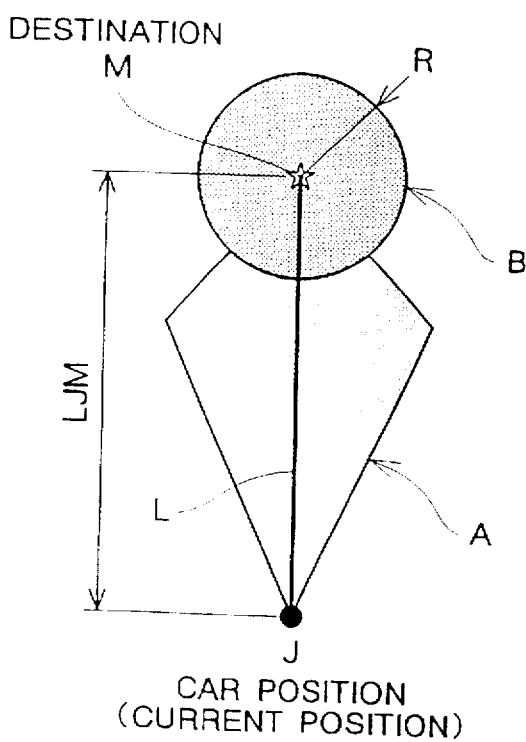

In FIG. 9(c), it is assumed that the place names of big cities or important positions of transportation exist around (far away from or in the neighborhood of) the destination, and a place name which is located within an area B having a radius of R from the destination M is judged as "suitable". In the manners of FIGS. 9(a) and 9(b), as the car approaches to the destination, the area permitting the "suitable" judgment is narrower. Therefore, there occurs a case where "NO" message is more frequently output even when a place name is input. However, by setting the area B having the destination M at the center thereof, the car can be navigated into the area having the predetermined radius R from the destination M.

Figure 9D:
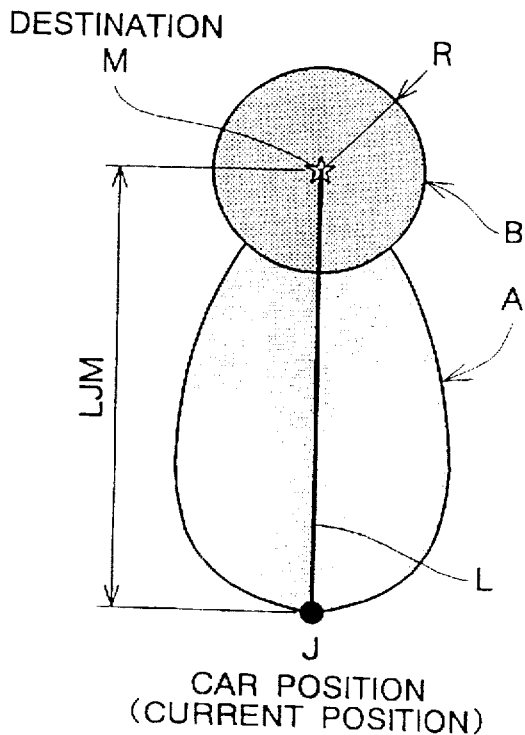

In FIG. 9(d), an area B having the destination M at the center thereof and an egg-shaped area A whose wider portion is set at the car position J side (near to the car position J) are combined with each other to set a gourd-shaped area as a whole. Accordingly, even when the car is located at the current position and approaches to the destination M, the frequency of the message "NO" is reduced.

Figure 10:
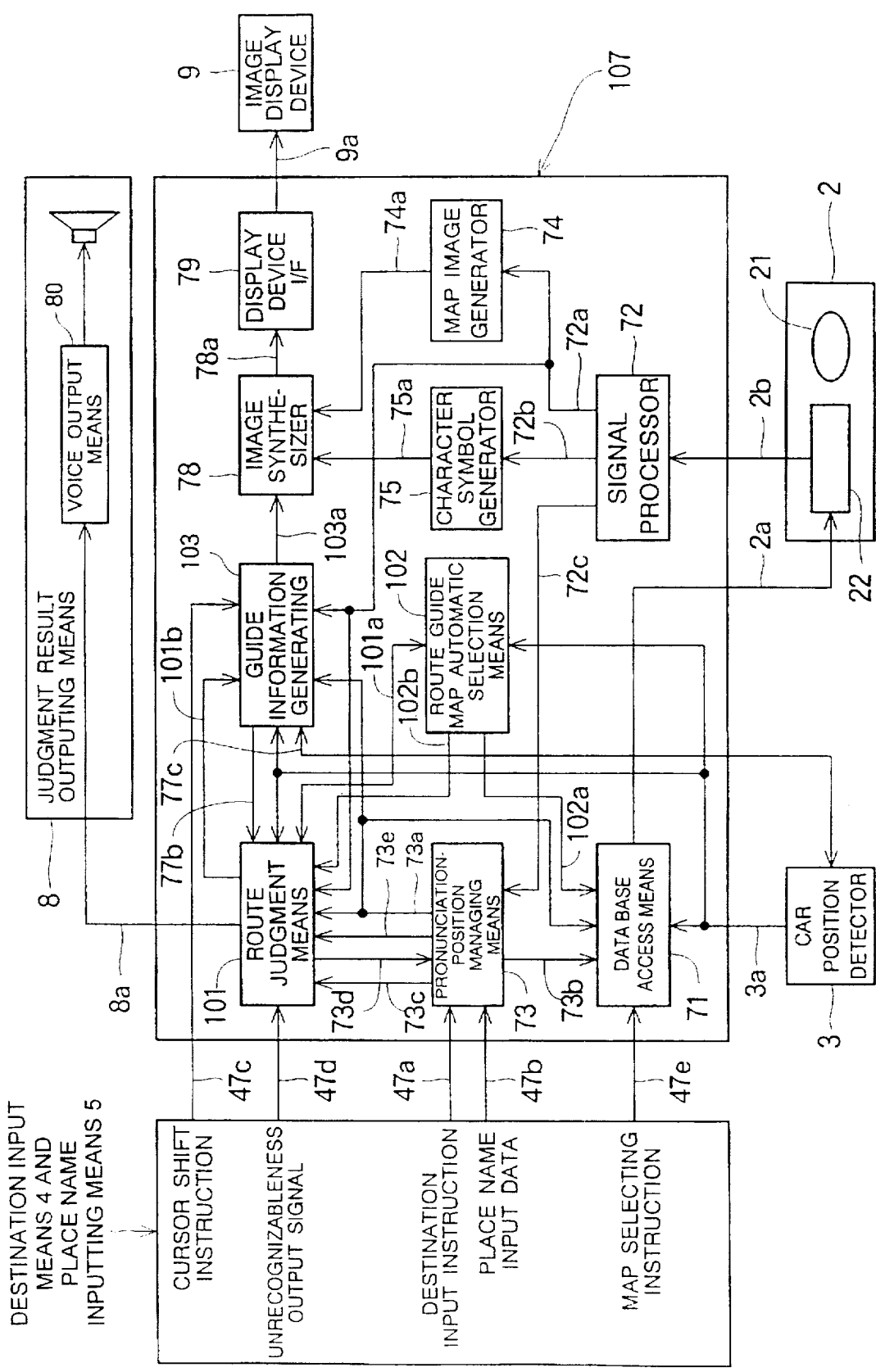
FIG. 10 is a block diagram showing another embodiment of the navigation controller.
Figure 12A:
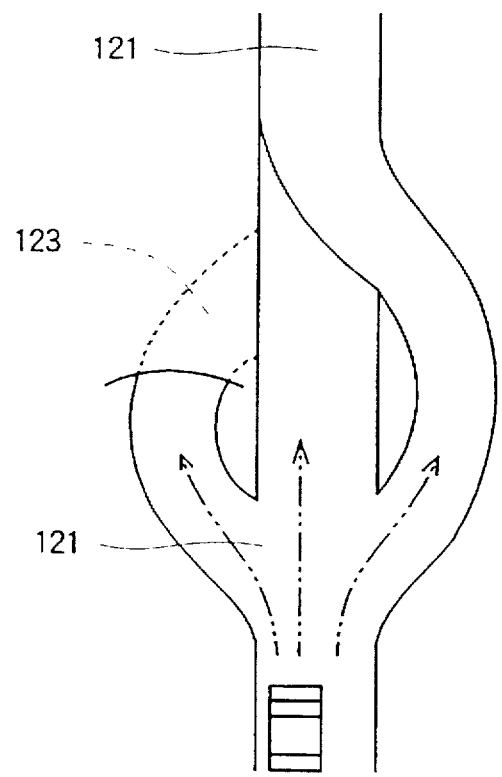
FIGS. 12(a) and 12(b) are schematic diagrams showing an example of a solid road.
Figure 12B:
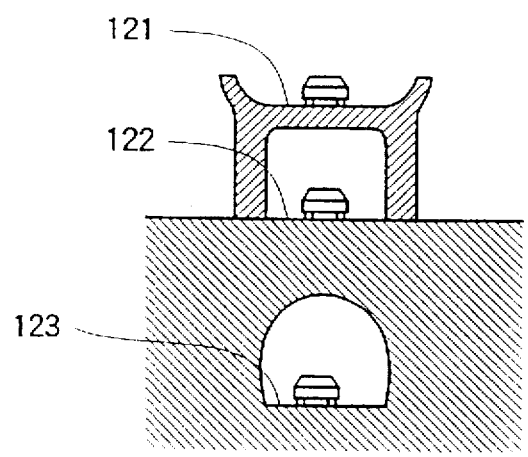
Figure 13:
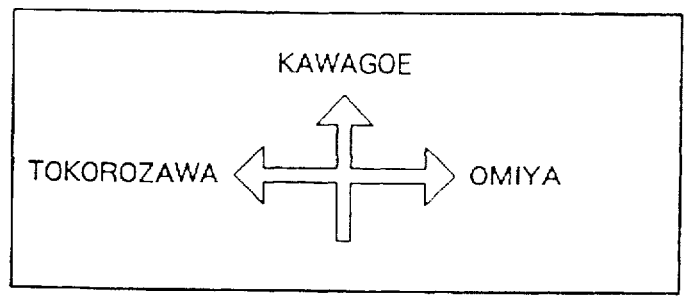
FIG. 13 is a schematic diagram showing an example of a road sign.
Figure 14:
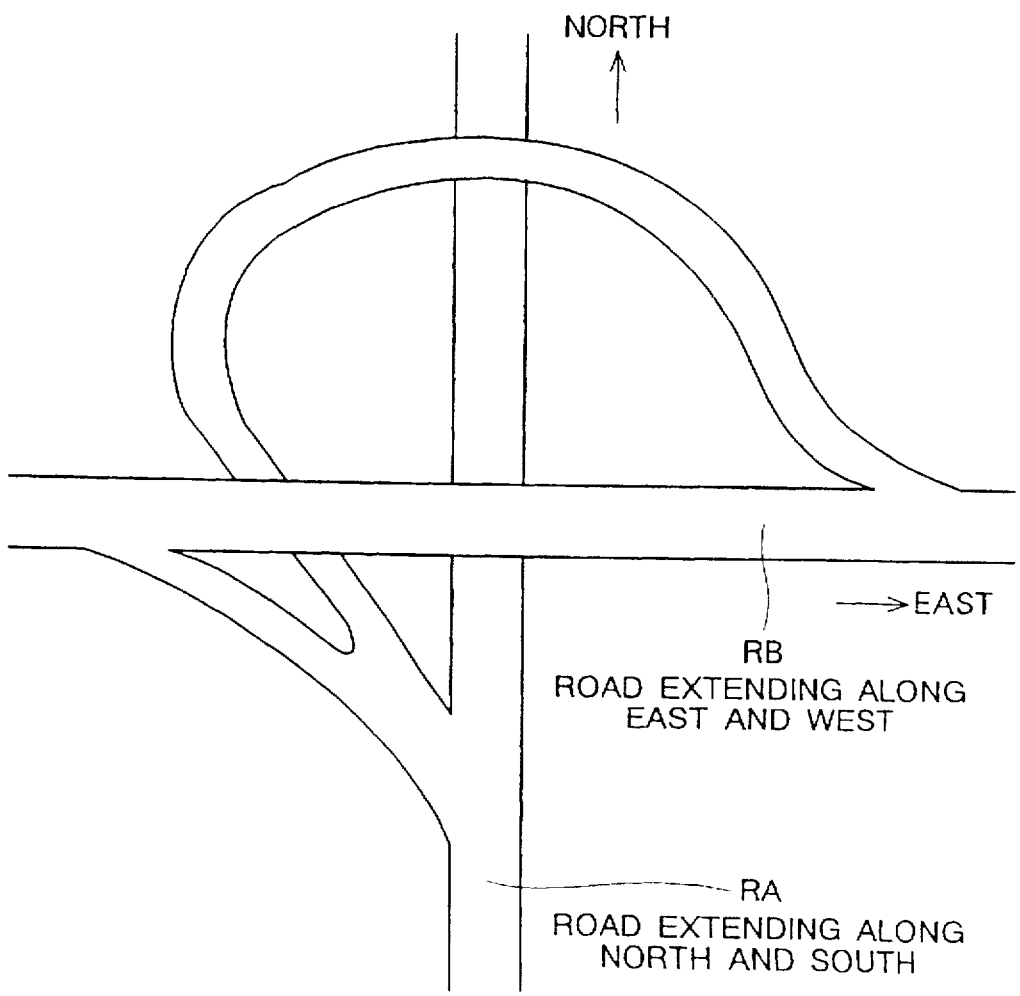
FIG. 14 is a schematic diagram showing an example of the structure of a solid crossing.

FIG. 10 is a block diagram showing another embodiment of the navigation controller.

When a place name is input for the course guide, the navigation controller 100 of this embodiment displays the position of the input place name on the screen of the image display device 9 so that the relationship between the position of the place name and the destination can be recognized, whereby the driver and passengers such as a passenger at the assistant driver's seat or the like can check the route by seeing the displayed map.

When the position data 73a of a place name such as a via-place or the like is supplied from the pronunciation-position managing means 73, the route judgment means 101 supplies a course guide map automatic selection means 102 with the position data 101a (JD,MD,KD) of the car position J, the destination M and the via-place or the like K.

The road guide map automatic selection means 102 has range data of each sectional map every reduced scale such as a detailed area, a middle area, a broad area, etc., and it first searches such a map as contains all the car position J, one or plural via-places, etc. K and the destination M. If there is the map concerned, it supplies the map indication data 102a indicating the map to the data base access means 71 to read out the data of the corresponding sectional map from the road map data base 2.

There is no sectional map containing all the car position J, the destination M and the via-places, etc. K, the road guide map automatic selection means 102 searches a sectional map containing the current position J and at least one via-place K, or a sectional map containing the current position J and the destination M. If the selected map does not contain the destination M, the road guide map automatic selection means 102 outputs information representing the fact to the route judgment means, 101, and if there is a via-place which is not contained in the selected map, the road guide map automatic selection means 102 outputs information 102b on the via-place to the route judgment means 101.

If a sectional map containing the car position J, the destination M and all the input via-places, etc. K, the route judgement means 101 supplies the position data 101b thereof (MD,KD) to the guide information generating means 103. On the basis of each position data 101b (MD,KD), the guide information generating means 103 generates image data for displaying a mark MM indicating the destination position and a mark MK indicating the position of each of the input via-places, etc. at the corresponding positions, and generates image data of lines LM and LK which connect the car position mark MJ based on the car position data 3a and the respective marks MM, MD. Thereafter, it supplies the generated image data 103a for the road guide to the image synthesizer 78. Through this operation, the road guide information is displayed on the screen of the image display device 9 while superposed on the road map.

FIGS. 11(a) and 11(b) show an example of a road guide image.

A case where the destination and all the input via-places are displayed at the same time is shown in FIG. 11(a). MM represents a mark indicating the position of the destination M, MK1 to MK3 (MKn) represent marks indicating the positions of the respective input via-places K1 to K3 (kn), MJ represents a mark indicating the vehicle position, LM represents a line connecting the vehicle position and the destination, and LK1 to LK3 (LKn) represent lines connecting the respective via-places, etc. to the vehicle position, respectively.

The route judgment means 101 judges a suitable route on the basis of the judgment manners shown in FIGS. 7 to 9 and outputs the judgment result 8a to the judgment result output means 108 to output the judgment result in the form of a voice message while outputs to the guide information generating means the position data 101b of the via-place or the like which is judged to be suitable.

Thereafter, the guide information generating means 103 displays the line LM extending from the vehicle position to the destination, the line extending from the vehicle position to the via-place or the like which is judged to be suitable (in this embodiment, line LK2), and the lines extending from the vehicle position to the other via-places (in this embodiment, lines LK1, LK3) with different line types (thickness of line, the kind of line such as a solid line, a chain line, etc.) or different display colors so that these lines are discriminable from one another.

Therefore, when the driver or the passenger inputs one or plural place names written on a road sign or the like into the car navigation system 1, a suitable route is indicated with a voice message, and a road map containing the destination and the input place name(s) is reproduced and displayed on the screen 9a of the image display device 9. In this case, the positions of the destination and the input via-place names, the vehicle position and the lines connecting the vehicle position to these positions are displayed on a map in such a way as to be easily visible, so that the route can be checked using the map display in combination.

When any map which contains the positions of all place names serving as targets for the route judgment cannot be selected, the route judgment means 101 supplies the guide information generating means 103 with place-name data on the positions of the place names which cannot be displayed on a selected map, and data 101b on the direction extending from the vehicle position to each of the positions of these place names and the distance in a straight line extending from the vehicle position to each of the positions.

Upon reception of these data 101b, the guide information generating means 103 displays an arrow extending from the vehicle position to the destination and an arrow extending from the vehicle position to a via-place or the like, and generates image data for guide information JM on the destination which indicates the place name of the destination and the distance to the destination at the arrow side, and for guide information FJK on the place names of the via-places and the distance of the straight line.

When the route judgment means 101 judges the course suitability on the basis of the route to the destination as shown in FIG. 8, the guide information generating means 103 may generate image data on a route extending from the destination and the input via-place or the like to display the route on the map.

Furthermore, in FIG. 10, the judgment result output means for imaging and displaying the route judgment result is constructed by the guide information generating means 103, the image synthesizer 78, the display device I/F unit 79 and the image display device 9 in the navigation controller 100. However, the image for the navigation guide may be generated by the image output means 90 shown in FIG. 5.

In the above embodiment, the judgment result 8a is output in the form of a voice message and an image display. However, it may be output in the form of either the voice or the image display. Besides, a selection switch may be provided for the judgment result so that the judgment result can be switched between the voice and the image display by an user's operation.

A car navigation system according to a preferred embodiment includes route judgment means for judging whether an input place name is suitable for a route extending to a destination, and judgment result outputting means for outputting a judgment result of the route judgment means. Accordingly, by inputting a place name written on a road sign or the like, it can be suitably guided which course should be selected. Therefore, even when a driver or the like does not recognize the geographical relationship between a destination and a place name written on a road sign or the like in a geographically unfamiliar area, he can take the suitable course on the basis of the place name written in the road sign or the like.

In a car navigation system according to an alternate embodiment, place names indicated on a map which is reproduced and displayed on a screen by an image display device and data on pronunciations of the place names (written in Kanji) are provided to a road map data base. Therefore, place names such as via-places, etc. can be specified by inputting the place names with voice using a voice recognition device. Furthermore, when a hand-writing input device is used, the place names such as via-places can be also specified by inputting the place names in Hiragana or Katakana with a pen or the like. Accordingly, a hand-writing character recognizing unit of this system can be more facilitated in construction than a hand-writing input device which needs recognition of Kanji. In addition, it is difficult to accurately input complicated Kanji characters during running because of car vibration. On the other hand, the Hiragana or Katakana input of the place names makes the hand-writing input operation more easily.

In a car navigation system according to another alternate embodiment, in addition to accurate (formal) pronunciations for place names, data on other pronunciations for the place names are provided. Accordingly, even when the driver or the like does not known the formal place names because of a geographically unfamiliar area, the place names written on road signs, etc. can be input by voicing or hand-writing an adequate pronunciation for each place name.

Furthermore, the destination input means and the place-name input means are constructed by using the voice recognition device or the handwrite character recognition device, the destination and the via-places can be easily input.

Whether the input place name is suitable as a via-place is output with voice using the voice synthesizer. On the screen of the image display device are displayed a map containing the current position of the car, and the lines connecting the current position to the destination and to the input place name (via-place).

What is claimed is:

1. A car navigation system comprising:

a road map data base;

a car position detecting device for detecting a current position of a car on a road map of said road map data base;

a destination input means for setting a destination on said road map of said road map data base;

place-name input means for inputting an input place name;

route judgment means for judging whether a direction of the input place name is the same as a direction of said destination; and route judgment result output means for outputting a judgment result.

2. The car navigation system as claimed in claim 1, wherein said road map data base includes place-name display data for place names to be displayed on a map which is reproduced on a screen of an image display device, and pronunciation data for said place names.

3. The car navigation system as claimed in claim 2, wherein said road map includes place-name display data of said place names to be displayed on said map, data on correct pronunciations for said place names in written form, and data on other pronunciations for said written form of said place names.

4. The car navigation system as claimed in claim 1, wherein said destination input means and said place-name input means are constructed by a voice recognition device.

5. The car navigation system as claimed in claim 1, wherein said destination input means and said place-name input means are constructed by a handwritten character input device and a handwritten character recognition device.

6. The car navigation system as claimed in claim 1, wherein said route judgment means judges on the basis of an intersection angle between a line connecting the current position of the car and the destination and a line connecting the current position of the car and the position of the input place name whether the direction of the input place name is the same as the direction of the destination.

7. The car navigation system as claimed in claim 1, wherein said route judgment means compares a route extending from the current position of the car to the destination with a route extending from the current position of the car to the position of the input place name, and judges on the basis of the distance of a common portion between the routes whether the direction of the input place name is the same as the direction of the destination.

8. The car navigation system as claimed in claim 1, wherein said route judgment means sets a prescribed area at both sides of a line connecting the current position of the car and the destination, and judges the input place name to be suitable as a via-place if the input place name is within the set area.

9. The car navigation system as claimed in claim 1, wherein when the destination is far away from the current position of the car, said route judgment means judges the input place name to be suitable as a via-place if the input place name is located at a prescribed distance or less from the destination.

10. A car navigation system as claimed in claim 1, wherein when the input place name contains a route on which the car can run at a higher speed than on a general road, said route judgment means converts the distance of the route to a shorter value than the actual distance thereof to calculate the distance to the destination, and a route through which the car arrives at the destination most early is selected on the basis of the converted distance.

11. The car navigation system as claimed in claim 1, wherein said route judgment result output means comprises a voice synthesizer.

12. The car navigation system as claimed in claim 1, wherein said judgment result output means comprises an image display device having a screen, wherein said image display device displays a map containing the current position of the car on the screen and further displays a line extending from the current position of the car to the destination and a line extending from the current position of the car to the position of the input place name on the screen.

13. A navigation method for a vehicle navigation system, comprising the steps of:

storing road map information including place names and positions in a road map of a road map data base of the system;

inputting into the system a desired destination on said road map;

calculating a travel route to said desired destination;

directing the vehicle along the calculated travel route;

while the vehicle is on route to said desired destination, inputting a place name other than said desired destination into the system;

judging whether a direction of said place name is the same as a direction of said desired destination; and outputting a judgment result.

14. A navigation method according to claim 13 further comprising obtaining said place name from a road sign on route to said desired destination.

* * * * *